United States Patent [19]

Jones

[11] Patent Number: 4,664,958

[45] Date of Patent: May 12, 1987

[54] HOLLOW PLASTIC CONTAINER HAVING AN INSERT

[75] Inventor: Loren A. Jones, Monclova, Ohio

[73] Assignee: Owens-Illinois, Inc., Toledo, Ohio

[21] Appl. No.: 789,208

[22] Filed: Oct. 18, 1985

[51] Int. Cl.⁴ .......................... B28B 1/02; B27N 5/02; B29C 45/14

[52] U.S. Cl. ........................................ 428/36; 428/35; 264/310; 264/515; 425/526

[58] Field of Search ..................... 428/35, 36; 264/310, 264/515; 425/526

[56] References Cited

U.S. PATENT DOCUMENTS

| | | |
|---|---|---|
| 3,575,949 | 4/1971 | Humphrey . |
| 3,705,931 | 12/1972 | Confer et al. . |
| 3,742,995 | 7/1973 | Confer et al. .......................... 150/0.5 |
| 4,213,933 | 7/1980 | Cambio ............................... 264/515 |
| 4,307,059 | 12/1981 | Cambio . |
| 4,342,799 | 8/1982 | Schwochert . |
| 4,511,529 | 4/1985 | Fowles et al. ....................... 264/515 |

Primary Examiner—John E. Kittle
Assistant Examiner—Patrick J. Ryan
Attorney, Agent, or Firm—Philip M. Rice

[57] ABSTRACT

A hollow thermoplastic container having an annular closure receiving insert embedded in the wall thereof made by blowing a hollow preform radially outwardly against the confines of a mold wherein a cone-shaped mandrel is positioned on the wall of the mold and supports the insert on the wall of the mold with the apex extending inwardly such that as the preform is blown outwardly, the plastic material is deflected and caused to form about the periphery of the insert.

6 Claims, 6 Drawing Figures

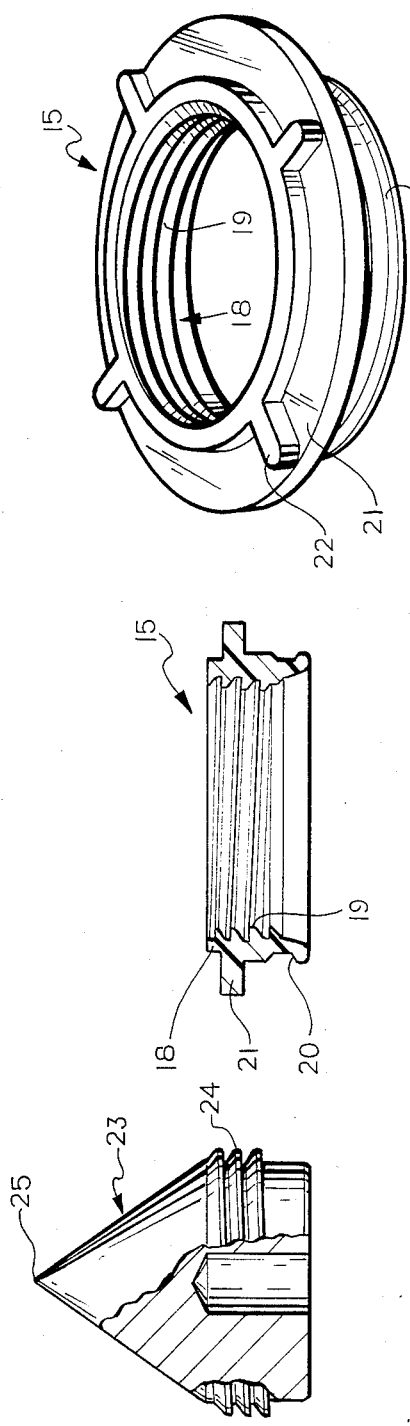
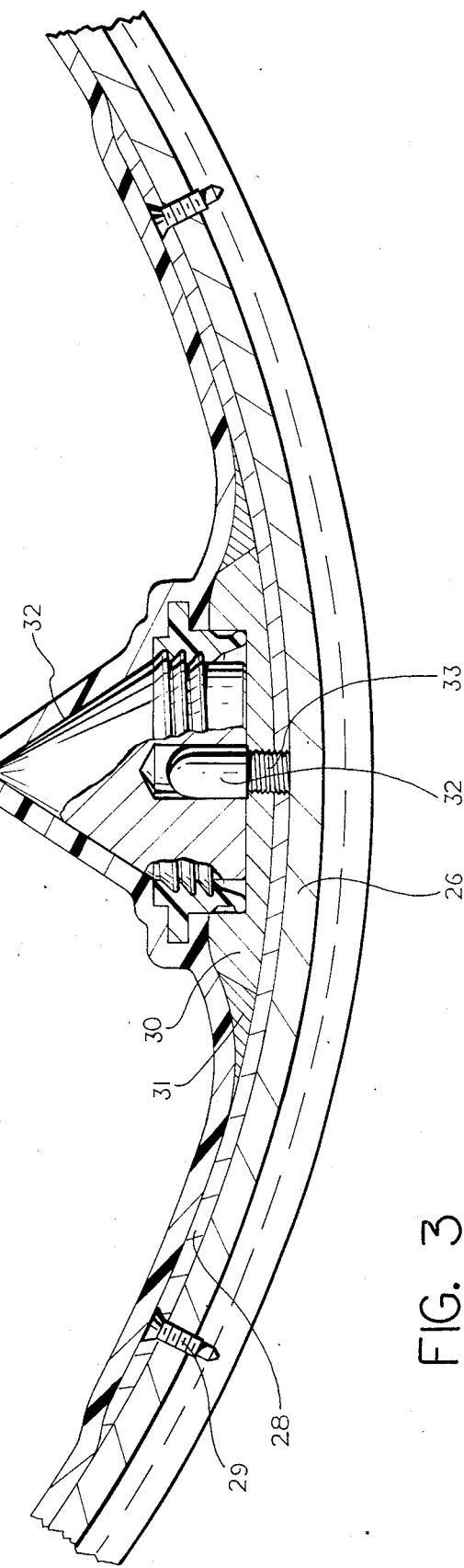

4,664,958

HOLLOW PLASTIC CONTAINER HAVING AN INSERT

This invention relates to hollow plastic containers and the like having an insert embedded in a wall thereof.

BACKGROUND AND SUMMARY OF THE INVENTION

In the making of hollow plastic containers, such as drums, it is desirable to provide an insert in a wall of the container which is adapted to receive a removable closure such as bung.

It has heretofore been suggested that inserts could be embedded in the wall of a hollow plastic container during the blowing of a preform outwardly against the confines of a mold. Thus, U.S. Pat. No. 4,342,799 shows a hollow body wherein an annular insert is positioned in a blow mold and has openings in the wall thereof such that as the material of the preform is blown outwardly the material penetrates the openings from opposite sides and becomes heat sealed together. In U.S. Pat. No. 4,307,059, a sterile needle puncture site is provided in a blow mold plastic material by positioning a rubber seal in a storage cover which in turn is positioned in the blow mold and the preform is blown outwardly either about or within the rubber seal. The positioning of various inserts or parts on a mold wall so that they become part of the hollow article that is blown is also shown, for example, in U.S. Pat. Nos. 3,705,931 and 3,575,949.

Among the objectives of the present invention are to provide a novel plastic body having an insert in a wall thereof for receiving a closure and a novel method and apparatus for making such an article wherein the insert is effectively locked and held in position and wherein the insert can function for receiving a closure where the hollow body comprises a drum.

In accordance with the invention a hollow thermoplastic container having an annular closure receiving insert embedded in the wall thereof is made by blowing a hollow preform radially outwardly against the confines of a mold wherein a mandrel having a pointed end is positioned on the wall of the mold and supports the insert on the wall of the mold with the point extending inwardly such that as the preform is blown outwardly, the plastic material is deflected and caused to form about the periphery of the insert.

DESCRIPTION OF THE DRAWINGS

FIG. 3 is a sectional view through a mold showing the formed hollow body.

FIG. 4 is a perspective view of an insert utilized in the invention.

FIG. 5 is a sectional view through the insert.

FIG. 6 is a part sectional side view of a mandrel utilized in the apparatus.

DESCRIPTION

Figure 1:
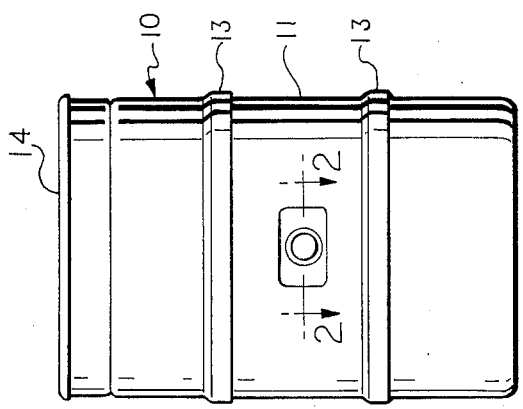
FIG. 1 is an elevational view of a plastic drum embodying the invention.

Referring to FIG. 1, the invention has particular utility in the making of large hollow plastic articles, such as drums 10 which conventionally have a side wall 11, a bottom wall 12 and integral annular ribs 13 on the side wall 11. Such a drum is conventionally closed by a separate cover 14.

In accordance with the invention an insert 15 is positioned in one of the walls of the drum for receiving a threaded bung 16. A protective cover 17 is provided and is crimped onto the insert.

As shown in FIGS. 4 and 5, the insert 15 comprises a body of plastic material or metal such as steel or brass, high density polyethylene or nylon. The body of the insert could be about any material. If made of material that melts at the same temperature as high density polyethylene, the drum wall and insert will be welded or bonded together. If the insert is metal like steel, it is encapsulated by drum material and is held in place by being nearly surrounded by plastic and the plastic shrink as it cools will grip the insert very tightly. Steel inserts have been successfully molded and did not leak. However, an insert that welds or bonds with the drum material gives a greater margin of safety against leakage.

The insert 15 includes an annular wall 18 on the inner surface of which threads 19 are formed and on the outer surface of which an annular groove 20 is formed. Further, the wall includes an integral radially outwardly extending flange 21 that has circumferentially spaced, radially extending locking ribs 22 about which the plastic flows as presently described.

The insert 15 is mounted upon a mandrel 23 that is fixed on the inner surface of the mold against which a hollow preform is to be blown. The mandrel 23 includes complementary threads 24 for holding the insert 15 and a point 25 that extends inwardly of the mold. As shown in FIG. 3, the mandrel 23 is supported on one part of the mold 26 for the container. More specifically, the mold 26 is partible and a base plate 28 is held in position on the inner surface of the mold part 26 by screws 29. A base member 30 is provided on the plate 29 and is held in position by a weldment 31. The exposed surfaces of the base member 30 and weldment 31 taper uniformly toward the base plate 28. A locator pin 32 is threaded into the base plate 28 as at 33. Preferably the surface 30 of the mandrel is frustoconical.

When the plastic preform is placed within the mold 26 and the mold closed about the preform and the preform is blown outwardly, the mandrel 23 functions to deflect the plastic material about the periphery of the insert 15 encapsulating the annular flange 21 as well as the ribs 22 to lock the insert 15. The point 25 of the mandrel insures that sufficient material is deflected to provide a firm hold and support for the insert 15.

Figure 2:
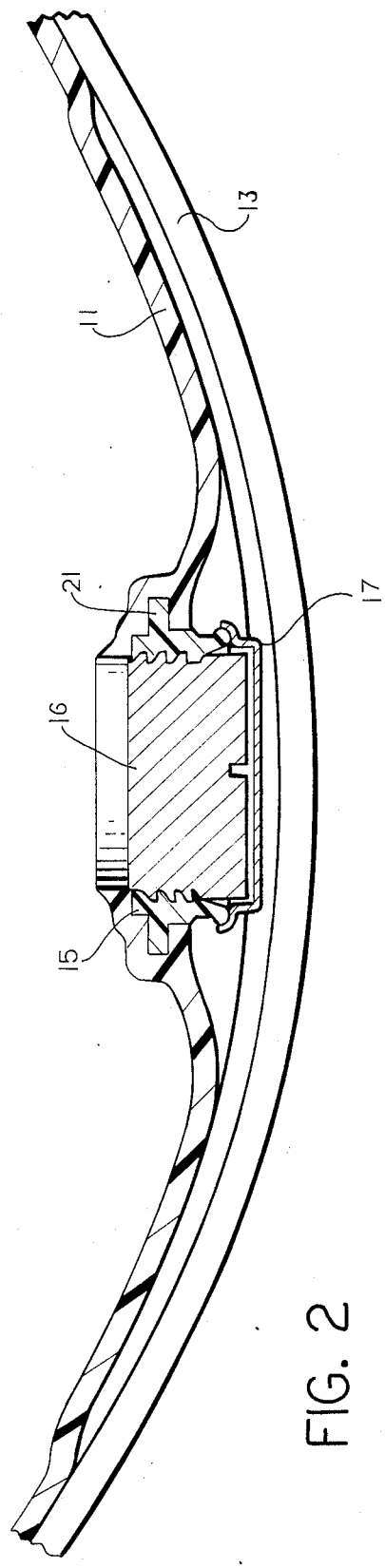
FIG. 2 is a fragmentary sectional view taken on an enlarged scale along the line 2—2 in FIG. 1.

After the drum is formed and removed from the molding area, the mandrel 23 is removed (unthreaded) from the molded-in insert 15 now in the side wall of the drum. After the mandrel 23 is removed, the plastic in the center of insert 15 is cut away and trimmed to provide an opening 34 in the center of insert 15 as shown in FIG. 2.

I claim:

1. A hollow thermoplastic blow molded container comprising
   a hollow plastic body,
   a closure receiving insert comprising an annular wall with axis ends embedded in the wall of the body,
   said insert including radial flange portions extending from the annular wall,
   said insert being formed with means on the inner surface thereof for engaging a closure, the wall of the plastic material being formed about the periphery and entirely embedding the annular wall, radial flange portions, and one axial end of said annular wall.

2. The hollow thermoplastic container set forth in claim 1 wherein said means for engaging the closure comprises threads.

3. The hollow thermoplastic container set forth in claim 1 wherein said radial flange portions comprise a continuous annular flange.

4. The hollow thermoplastic container set forth in claim 3 including radial projections extending axially on said insert embedded in said plastic of said wall for holding said insert against rotation.

5. The hollow thermoplastic container set forth in claim 1 wherein said insert is made of plastic.

6. The hollow thermoplastic container set forth in claim 1 wherein said insert is made of metal.

* * * * *